US012692738B2

(12) United States Patent
Bals

(10) Patent No.: US 12,692,738 B2
(45) Date of Patent: Jul. 28, 2026

(54) DRIVE DEVICE HAVING A SUPPORTING DEVICE

(71) Applicant: Edscha Engineering GmbH, Remscheid (DE)

(72) Inventor: Jochen Bals, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 327 days.

(21) Appl. No.: 18/269,947

(22) PCT Filed: Nov. 25, 2021

(86) PCT No.: PCT/DE2021/100934
§ 371 (c)(1),
(2) Date: Jun. 27, 2023

(87) PCT Pub. No.: WO2022/144057
PCT Pub. Date: Jul. 7, 2022

(65) Prior Publication Data

US 2024/0060528 A1 Feb. 22, 2024

(30) Foreign Application Priority Data

Dec. 28, 2020 (DE) ..................... 20 2020 107 574.8

(51) Int. Cl.
*E05F 1/10* (2006.01)

(52) U.S. Cl.
CPC ......... *E05F 1/105* (2013.01); *Y10T 74/18576* (2015.01)

(58) Field of Classification Search
CPC ........................... E05F 1/105; Y10T 74/18576
USPC ........................................................ 74/89.23
See application file for complete search history.

(56) References Cited

U.S. PATENT DOCUMENTS

| | | | |
|---|---|---|---|
| 2,387,800 | A | 10/1945 | Leland et al. |
| 2009/0000201 | A1 | 1/2009 | Fahl |
| 2011/0290050 | A1 | 12/2011 | Kummer et al. |
| 2020/0165856 | A1 | 5/2020 | Scheuring et al. |
| 2021/0317695 | A1 | 10/2021 | Schneiderbanger et al. |

FOREIGN PATENT DOCUMENTS

| | | | |
|---|---|---|---|
| DE | 102018121033 | A1 | 3/2020 |
| DE | 102019105456 | A1 | 9/2020 |
| EP | 2199513 | A1 | 6/2010 |

OTHER PUBLICATIONS

International Preliminary Report on Patentability for PCT/DE2021/100934.
Search Report for PCT/DE2021/100934.

*Primary Examiner* — T. Scott Fix
(74) *Attorney, Agent, or Firm* — Davidson Kappel LLC

(57) ABSTRACT

A drive device includes a housing having a first housing part and a second housing part. The first housing part is axially movable in relation to the second housing part along a longitudinal axis of the housing. The drive device includes a preloading means located in the housing for axially preloading the first housing part with respect to the second housing part; a spindle rod coupled to one of the first housing part and the second housing part; and a spindle nut. The spindle nut is in threaded engagement with the spindle rod and is coupled to the other one of the first housing part and the second housing part. A stop part is at least indirectly connected to the first housing part, and a first end of the preloading means rests against the stop part.

16 Claims, 2 Drawing Sheets

DRIVE DEVICE HAVING A SUPPORTING DEVICE

The present disclosure relates to a drive device, in particular a linear drive for a pivotable vehicle flap, and to a supporting device.

BACKGROUND

Drive devices are known from practice, in particular for power-adjustable vehicle flaps, which comprise a telescopic housing, a spindle rod arranged in the housing and a spindle nut in threaded engagement with the spindle rod. The housing usually comprises a first housing part and a second housing part, which are slidably interlocked with respect to one another in such a manner that the housing can be extended and retracted accordingly. The spindle nut is coupled to one of the first housing part and the second housing part, and the spindle rod is coupled to the other of the first housing part and the second housing part. In addition, drive devices known in practice also comprise a preloading means, usually designed as a coil spring, which supports a drive movement in at least one direction or serves for safety in the event that the drive device has a defect and in this manner can prevent a vehicle flap driven via the drive device from executing an unbraked closing movement due to the defect, which could lead to trapping or other injuries to persons located in the vicinity of the vehicle flap. In addition, supporting devices designed as spring legs are also known from practice, which also serve to at least slow down or prevent a closing movement of a vehicle flap.

SUMMARY

It is an object of the present disclosure to create a drive device, in particular a linear drive for a pivoting vehicle flap, which can be manufactured cost-effectively and is designed in a weight-saving way. Furthermore, it is the object of the present disclosure to specify a supporting device with a preloading means, in which the preloading means is designed in a space-saving and weight-saving way.

According to an aspect of the present disclosure, a drive device, in particular a linear drive for a vehicle flap, is provided comprising a housing having a first housing part and a second housing part, wherein the first housing part is axially displaceable relative to the second housing part along a longitudinal axis of the housing. Furthermore, the drive device comprises a preloading means disposed in the housing for axially preloading the first housing part with respect to the second housing part, and a spindle rod, wherein the spindle rod is coupled to one of the first housing part and the second housing part. Furthermore, the drive device comprises a spindle nut, wherein the spindle nut is threadedly engaged with the spindle rod and coupled to the other of the first housing part and the second housing part. The drive device according to the present disclosure is characterized in that a preloading means is at least indirectly connected to the first housing part, wherein a first end of the preloading means abuts against the stop part. Advantageously, the provision of a stop part creates the possibility of incorporating different preloading means with, in particular, different characteristic curves and overall lengths into the drive device, thus reducing the overall costs for production and the overall weight of the drive device, since shorter preloading means with correspondingly less weight can also be effectively used in the drive device.

In a particularly preferred embodiment, a second end, opposite the first end, of the preloading means abuts against the second housing part. Advantageously, only one stop part is required to provide the ideal installation space for the preloading means used merely by adjusting the axial position of the stop part within the housing.

In a preferred further embodiment, the stop part is connected to the first housing part at least indirectly and preferably directly by material bonding, in particular by means of a weld. Advantageously, the stop part is thus particularly securely connected axially to the first housing part, such that the forces acting axially on the stop part by the preloading means cannot cause any displacement or loosening of the stop part relative to the first housing part. Particularly preferably, the stop part is axially secured by a laser weld.

Preferably, a first guide tube is connected to the first housing part. It is expedient that the preloading means radially surrounds the first guide tube at least in sections. The first guide tube is conveniently used to guide the preloading means radially to prevent the preloading means from bending in the radial direction. In an expedient further embodiment, a second guide tube is connected to the second housing part, wherein the first guide tube and the second guide tube are axially nested in one another and axially displaceable relative to one another.

It is expedient that the preloading means surrounds both the first guide tube and the second guide tube at least in sections. Advantageously, this ensures that a guide formed by the first guide tube and the second guide tube for the preloading means is designed to be telescopic, as is the entire housing of the drive device, and thus radial guidance can be ensured at any point of the preloading means during operation of the drive device, regardless of the length of the preloading means.

Particularly preferably, the first guide tube is arranged in the first housing part concentrically around the longitudinal axis of the housing. Advantageously, this ensures that a constant radial cross-section is provided for the preloading means and thus uniform radial guidance is achieved for the preloading means.

In a particularly preferred further development, it is provided that the stop part is directly connected to the first guide tube. In a convenient embodiment, the stop member is connected to the first guide tube in a section located between a first end and a second end of the guide tube. Alternatively, the stop member is directly connected to the guide tube at one of the first end and the second end of the guide tube. Advantageously, this allows preloading means to be inserted into the drive device which are designed to be shorter and thus do not have to occupy a major part of the overall length of the housing of the drive device in order to provide a preloading of the first housing part relative to the second housing part.

The stop part is preferably designed in the shape of a ring. Particularly preferably, the stop part is designed as a hollow cylinder. Advantageously, the stop part can be produced cost-effectively in large quantities, since no elaborately designed tool is required for production. Further advantageously, the stop part can thus be pushed onto the first guide tube, which is also in the form of a hollow cylinder. Conveniently, the stop part is arranged concentrically around the longitudinal axis of the housing. More preferably, the stop part is connected with a hollow cylindrical inner side at least in sections to a cylindrical outer side of the first guide tube. Advantageously, the stop part can be pushed onto the first guide tube and the axial position on the first guide tube can be precisely defined, such that in the completely assembled drive device there is an installation space adapted to the preloading means to be installed, wherein advantageously a configuration designed for the specific characteristic of the preloading means can be realized. In addition, this advantageously allows the use of shorter and thus lighter preloading means.

Accordingly, this also advantageously reduces the overall weight of the entire drive device.

In a particularly preferred embodiment, the stop part is connected to the first guide tube by material bonding, in particular by welding. In an expedient further embodiment, the stop part is connected to the first guide tube by laser welding. In an advantageous embodiment, the stop part is made of plastics material. Advantageously, the stop part can be mass-produced with high precision and subsequently connected to suitably designed guide tubes, particularly by welding.

Particularly preferably, the first guide tube is made of plastics material. In one useful embodiment, the stop part is made of a laser-transparent plastics material and the first guide tube is made of a laser-intransparent plastics material. Advantageously, a material connection between the first guide tube and the stop part can thus be produced quickly and reliably by laser welding. In an alternative embodiment, it is provided that the stop part is annular or designed as a hollow cylinder and is connected with an outer side at least in sections to an inner side of the first housing part.

Particularly preferably, the preloading means is designed as a coil spring. Advantageously, the preloading means can be produced with high precision and in large quantities, wherein the characteristic curve can be determined by correspondingly adjusting the number of turns or the pitch of the turns. Particularly preferably, the preloading means is arranged radially at least in sections between an outer side of the first guide tube and an inner side of the first housing part. Advantageously, this makes it possible to limit the spring installation space available for the preloading means at least on one side by fastening the stop part to one of the first guide tube and first housing part. This also ensures that the preloading means, which is designed as a coil spring, is guided securely in the radial direction and that buckling or bending in the radial direction is adequately prevented.

According to another aspect of the present disclosure, a supporting device is provided comprising a housing having a first housing part and a second housing part, wherein the first housing part is axially displaceable over the second housing part along a longitudinal axis of the housing. Furthermore, the supporting device comprises a preloading means arranged in the housing for axially preloading the first housing part with respect to the second housing part. The supporting device according to the present disclosure is characterized in that a stop part is attributed indirectly connected to the first housing part, wherein a first end of the preloading means abuts against the stop part. Advantageously, the installation space available for the preloading means can be adapted by appropriate axial displacement of the stop part and subsequent fixing, so that more cost-effective preloading means can be used in the supporting device, in particular due to a shorter overall length, wherein the manufacturing costs are correspondingly lower and the overall weight of the supporting device is reduced.

Preferably, a first guide tube is connected to the first housing part. It is expedient that the preloading means radially surrounds the first guide tube at least in sections. The first guide tube is conveniently used to guide the preloading means radially to prevent the preloading means from bending in the radial direction. In an expedient further embodiment, a second guide tube is connected to the second housing part, wherein the first guide tube and the second guide tube are axially nested in one another and axially displaceable relative to one another.

In a particularly preferred embodiment, the stop part is connected to the first guide tube by material bonding, in particular by welding. In an expedient further embodiment, the stop part is connected to the first guide tube by laser welding. In an advantageous embodiment, the stop part is made of plastics material. Advantageously, the stop part can be mass-produced with high precision and subsequently connected to suitably designed guide tubes, particularly by welding.

Particularly preferably, the first guide tube is arranged in the first housing part concentrically around the longitudinal axis of the housing. Advantageously, this ensures that a constant radial cross-section is provided for the preloading means and thus uniform radial guidance is achieved for the preloading means.

In a particularly preferred further embodiment, it is provided that the stop part is directly connected to the first guide tube. In a convenient embodiment, the stop part is connected to the first guide tube in a section of the first guide tube located between a first end and a second end of the guide tube. Alternatively, the stop part is directly connected to the guide tube at one of the first end and second end of the guide tube. Advantageously, this allows preloading means to be inserted into the supporting device which are designed to be shorter and thus do not have to occupy a major part of the overall length of the housing of the supporting device in order to provide a preloading of the first housing part relative to the second housing part.

The stop part is preferably designed in the shape of a ring. Particularly preferably, the stop part is designed as a hollow cylinder. Advantageously, the stop part can be produced cost-effectively in large quantities, since no elaborately designed tool is required for production. Further advantageously, the stop part can thus be pushed onto the first guide tube, which is also in the form of a hollow cylinder. Conveniently, the stop part is arranged concentrically around the longitudinal axis of the housing. Further preferably, the stop part is connected with a hollow cylindrical inner side at least in sections to a cylindrical outer side of the first guide tube. Advantageously, the stop part can be pushed onto the first guide tube and the axial position on the first guide tube can be precisely determined, such that in the overall fully assembled supporting device there is a spring installation space adapted to the preloading means to be installed, wherein advantageously a configuration designed for the specific characteristic of the preloading means can be realized. In addition, this advantageously allows the use of shorter and thus lighter preloading means. Accordingly, this also advantageously reduces the overall weight of the entire supporting device.

Further advantages, properties, and developments of the present disclosure emerge from the following description of a preferred exemplary embodiment.

BRIEF SUMMARY OF THE DRAWINGS

The present disclosure is explained in more detail below with reference to the accompanying drawings using a preferred exemplary embodiment.

DETAILED DESCRIPTION

Figure 1:
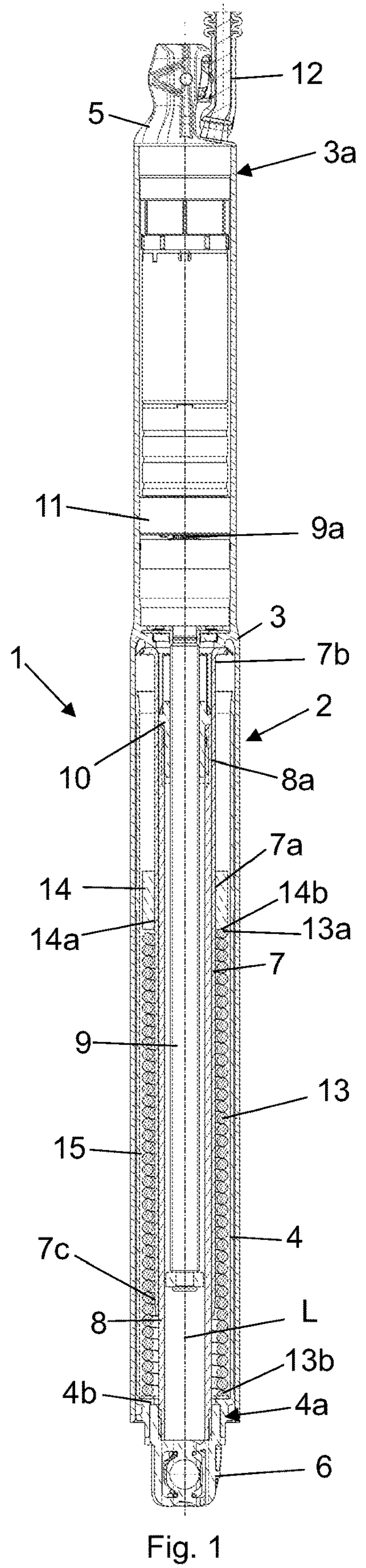
FIG. 1 shows a preferred exemplary embodiment of a drive device according to the present disclosure in a cross-sectional view.

FIG. 1 shows a preferred exemplary embodiment of a drive device 1 according to the present disclosure in a cross-sectional view. The drive device 1 comprises a housing 2, which comprises a first housing part 3 and a second housing part 4, which are inserted into one another and can be displaced with respect to one another in the direction of a longitudinal axis L of the housing 2. The drive device 1 is thus designed as a telescopic linear drive and comprises a first joint part 5 arranged at a first end 3*a* of the first housing part 3 and designed as a ball socket, and a second joint part 6 arranged at a first end 4*a* of the second housing part 4 and also designed as a ball socket. Advantageously, the drive device 1 can thus be hinged with the first end 3*a* of the first housing part 3 via the first joint part 5 to one of the vehicle flap and vehicle body and with the second end 4*a* via the second joint part 6 to the other of the vehicle flap and vehicle body. The first joint part 5 and the second joint part 6 are each pressed into the first end 3*a* of the first housing part 3 and the first end 4*a* of the second housing part 4, respectively.

Further, the drive device 1 comprises a first guide tube 7 which is fixedly connected to the first housing part 3. Here, the first housing part 3 and the first guide tube 7 are arranged concentrically around the longitudinal axis L of the housing 2. Further, the drive device 1 comprises a second guide tube 8, which is connected via a screw connection to the second joint part 6 or, correspondingly, indirectly to the second housing part 4. The second housing part 4 and the second guide tube 8 are arranged concentrically around the longitudinal axis L of the housing 2, wherein the second guide tube 8 has a smaller outer diameter than the first guide tube 7. Advantageously, the second guide tube 8 has an outer diameter which corresponds approximately to the inner diameter of the first guide tube 7, such that the first guide tube 7 radially surrounds the second guide tube 8, wherein the first guide tube 7 is axially displaceable relative to the second guide tube 8. Advantageously, a displacement of the first housing part 3 relative to the second housing part 4 simultaneously causes a displacement of the first guide tube 7 relative to the second guide tube 8. Since the first guide tube 7 and the second guide tube 8 are inserted into each other, a continuous guide concentrically arranged in the housing 2 is formed, which is also designed to be telescopic.

In the housing 2, a spindle rod 9 and a spindle nut 10 are arranged concentrically about the longitudinal axis L, wherein the spindle rod 9 is in threaded engagement with the spindle nut 10. In this case, the spindle nut 10 is fixedly connected to an inner side 8*a* of the second guide tube 8, such that the spindle nut 10 is arranged in a rotationally fixed and stationary manner relative to the second guide tube 8 or the second housing part 4. The spindle rod 9 is connected with a first end 9*a* to an output shaft of a drive unit 11 via a serration in a torsionally locked manner in order to drive the spindle rod 9 in rotation by a motor. The drive unit 11 is permanently arranged in the first housing part 3 and is supplied with power via a supply line 12. Furthermore, the spindle rod 9 is axially secured against displacement relative to the drive unit 11 or the first housing part 3. By corresponding rotation of the spindle rod 9 by means of the drive unit 11, the spindle nut 10 and, together with the spindle nut 10, also the second housing part 4 or the second guide tube 8 are thus displaced axially relative to the first housing part 3 or the first guide tube, such that the housing 2 is retracted or extended accordingly. With the first joint part 5 appropriately coupled to one of the vehicle body and vehicle flap and the second joint part 6 coupled to the other of the vehicle body and vehicle flap, a pivoting movement of the vehicle flap can be driven thereby by means of the drive device 1.

The drive device 1 further comprises a preloading means 13 designed as a coil spring, which serves to preload the first housing part 3 relative to the second housing part 4 at least in the extension direction. Advantageously, this provides a supporting device integrated in the drive device 1, which serves as an auxiliary means for supporting a vehicle flap, particularly in the event of a defect in the drive device 11. In addition, this reduces the load on the drive device 11. An annular stop part 14 is arranged on an outer side 7*a* of the hollow cylindrical first guide tube 7. The stop part 14 is axially secured to the first guide tube 7 by welding. The stop part 14 is designed as an annular hollow cylinder and rotates radially around the hollow-cylindrical first guide tube 7. An inner side 14*a* of the stop part 14 contacts the outer side 7*a* of the first guide tube. Here, an inner diameter of the first stop part 14 corresponds approximately to the outer diameter of the first guide tube 7. Advantageously, the stop part 14 can be slid onto the first guide tube 7 and, depending on the specific preloading means 13 used, can be fastened axially to the first guide tube 7 by welding in an area between a first end 7*b* and a second end 7*c* of the first guide tube.

In this case, a first end 13*a* of the preloading means 13 rests against an end face 14*b* of the stop part 14, and a second end 13*b*, opposite the first end 13*a*, of said preloading means rests against an annular base 4*b* at the first end 4*a* of the second housing part 4. Advantageously, the spring installation space 15 available for the preloading means 13 can be varied by displacement of the stop part 14 along the longitudinal axis L on the outer circumference of the first guide tube 7 and fixed by subsequently welding it. In the embodiment example shown here, the spring installation space 15 is delimited by the annular base 4*b* of the second housing part and the stop part 14. More advantageously, this makes it possible to install shorter preloading means in the drive device, thus reducing the cost of production.

Figure 2:
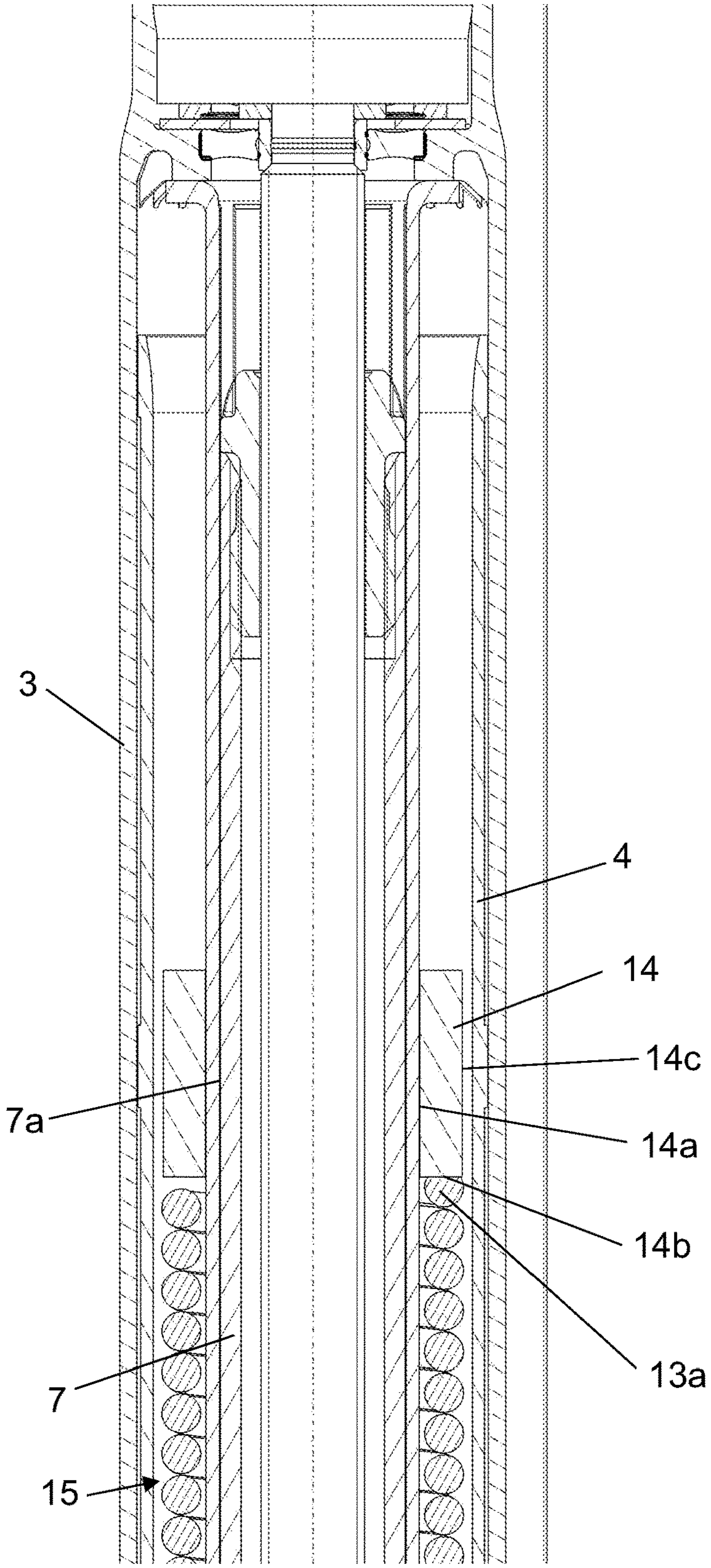
FIG. 2 shows an enlarged view of the drive device from FIG. 1 in the area of the stop part.

FIG. 2 shows an enlarged view of the drive device from FIG. 1 in the area of the stop part 14. In this view, it can be clearly seen that the stop part 14 is pushed with its cylindrical inner side 14*a* onto the outer side 7*a* of the first guide tube 7, so that the hollow cylindrical stop part 14 radially surrounds the first guide tube 7. It can further be seen that a cylindrical outer surface 14*c* of the stop part 14 is not in contact with the second housing part 4, so that when the first housing part 3 is axially displaced relative to the second housing part 4, there is no interference from the first stop part 14. It can also be seen that the flat first end 13*a* of the preloading means 13, which is designed as a coil spring, rests against the flat end face 14*b* of the first stop part 14 facing the preloading means 13, so that the first stop part 14 limits the spring tree 15 provided for the first preloading means 13 on one side.

The present disclosure has been explained above on the basis of an embodiment in which the stop part is annular or designed as a hollow cylinder and is made of plastics material. It is understood that the stop part can also be made of metal, in which case the tube to be connected to the stop part is also expediently made of metal and a connection is produced by contact welding, for example. It is further understood that the stop part may also be designed to be rectangular in cross-section, wherein in any case it must be possible for the stop part to be connected and axially secured to one of the first guide tube or also the second housing part to form a reliable stop for the preloading means.

The invention claimed is:

1. A drive device comprising:

a housing having a first housing part and a second housing part, the first housing part being axially displaceable relative to the second housing part along a longitudinal axis of the housing;

a preloading means arranged in the housing for axial preloading of the first housing part relative to the second housing part;

a spindle rod coupled to one of the first housing part and the second housing part;

a spindle nut threadedly engaged with the spindle rod and coupled to the other of the first housing part and the second housing part; and a stop part connected to the first housing part by material bonding, a first end of the preloading means abutting against the stop part, wherein a first guide tube is connected to the first housing part, wherein the first guide tube is made of plastics material, wherein the stop part is made of a laser-transparent plastics material and the first guide tube is made of a laser-intransparent plastics material.

2. The drive device according to claim 1, wherein a second end, opposite the first end, of the preloading means abuts against the second housing part.

3. The drive device according to claim 1, wherein the stop part is axially secured via a laser weld.

4. The drive device according to claim 1, wherein the preloading means radially surrounds the first guide tube at least in sections.

5. The drive device according to claim 1, wherein a second guide tube is connected to the second housing part, wherein the first guide tube and the second guide tube are axially inserted into one another and axially displaceable relative to one another.

6. The drive device according to claim 5, wherein the preloading means radially surrounds both the first guide tube and the second guide tube at least in sections.

7. The drive device according to claim 6, wherein the first guide tube is arranged in the first housing part concentrically around the longitudinal axis of the housing.

8. The drive device according to claim 1, wherein the stop part is directly connected to the first guide tube.

9. The drive device according to claim 1, wherein the stop part is directly connected to the first guide tube in a section located between a first end and a second end of the first guide tube.

10. The drive device according to claim 1, wherein the stop part is annular.

11. The drive device according to claim 1, wherein the stop part is designed as a hollow cylinder.

12. The drive device according to claim 1, wherein the stop part is arranged concentrically around the longitudinal axis of the housing.

13. The drive device according to claim 1, wherein a hollow cylindrical inner side of the stop part is connected at least in sections to a cylindrical outer side of the first guide tube.

14. The drive device according to claim 1, wherein the stop part is connected to the first guide tube by material bonding.

15. The drive device according to claim 14, wherein the stop part is connected to the first guide tube by laser welding.

16. The drive device according to claim 1, wherein the preloading means is designed as a coil spring.

* * * * *